3,132,416
METHOD OF AND APPARATUS FOR MANUFACTURING AND INSTALLING CONTINUOUS CONDUIT
James M. Hait, San Jose, Calif., assignor to FMC Corporation, a corporation of Delaware
Filed Mar. 14, 1961, Ser. No. 95,582
3 Claims. (Cl. 29—429)

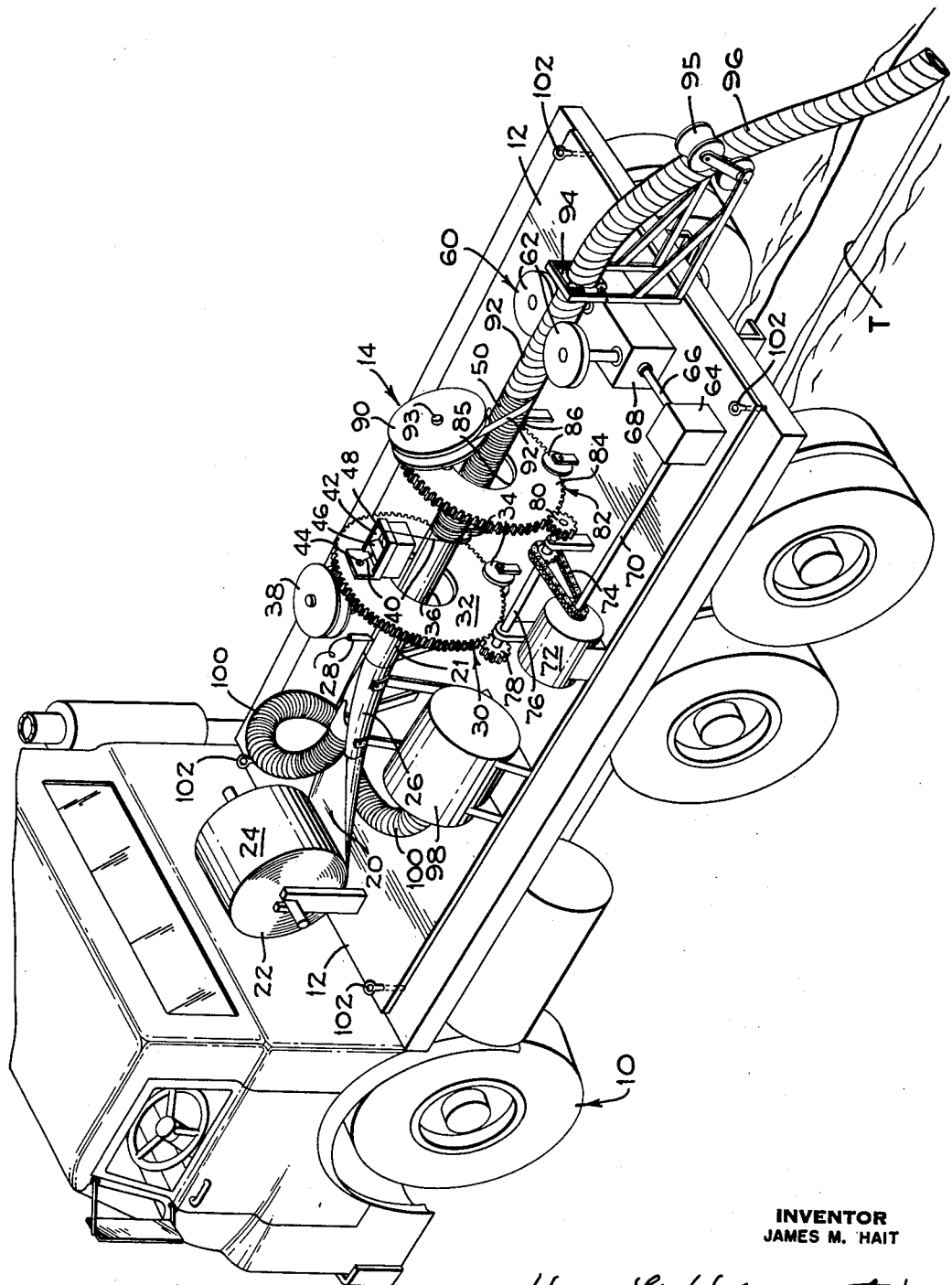

The present invention pertains to a method of, and apparatus for, manufacturing continuous fluid handling conduits, and more particularly relates to the production of a continuous conduit that can be simultaneously manufactured and installed in the field.

There are many situations in which it is necessary to produce pipe close to the point of its installation. Such situations may arise because some locations are so inaccessible that transportation of the required quantity of pipe would present difficult problems. For example, at a remote military installation or at an isolated exploration base, the speed and convenience of manufacturing a piping system on the site, rather than requiring its importation, are desirable.

Accordingly, one object of the present invention is a process, and apparatus for carrying out the process, whereby a continuous semi-rigid tubing may be manufactured from a mobile platform so that the tube may be laid in or on the ground, as produced.

Another object of the present invention is the provision of a semi-rigid tube manufacturing method for rapidly producing a continuous tube formed of a fluid-tight metal liner having resin impregnated reinforcement and protective wrappings.

Another object of this invention is to provide a method and apparatus for producing a continuous lightweight semi-rigid tubing which is highly resistant to both collapse from exterior pressures and bursting from interior pressures, and is not externally corroded by soil or water salts.

These and other objects and advantages of the present invention will become apparent from the following description and the accompanying schematic drawing depicting one form of apparatus for practicing the method defined by the present invention.

The illustrated apparatus includes a flat-bed truck or similar conveyance 10 having a base platform 12 which is removably secured to the truck bed and acts as a support for a group 14 of coacting mechanisms that are adapted for simultaneously forming a sealed metallic tube, reinforcing the tube with an overlay of thermosetting resin and fibers, and effecting the curing or setting of the resin on the completed tube.

The term "semi-rigid tube" as used herein is intended to include any tube that can be longitudinally flexed but is substantially rigid in radial directions. The semi-rigid conduit produced according to the process of the present invention is substantially rigid in its radial dimensions so that the conduit may be buried in a backfilled trench without damage, provided that it is subject only to the pressure of the fill and not to extraneous highly concentrated pressures such as might be caused by heavy vehicles operating in the area. Longitudinal flexibility is provided so that the conduit can easily flex without damage during movement from the elevated platform 12 into a trench T.

The initial step in carrying out the process of the present invention is the withdrawal of a flat web 20 of flexible sheet metal stock 22 from a continuous rotatable roll 24 into a plow 26 which is fixed to the platform 12 in an elevated position. The sheet metal stock 22 may be simply a coiled flat web or can be a transversely precurled web of metal stock possessing great resiliency so that it can be coiled with the web flat, but will spring into a partial tube upon unrolling. In either form of the web stock, flat or precurled, the plow can easily be constructed to handle any of a wide range of thicknesses.

The plow 26 is in the form of a thick metal tube having a longitudinal slit which is opened to form a converging area through the plow to progressively curl the side edge portions of the web 20 upwardly and toward each other until they are in slightly overlapping relation and the web is rolled into a substantially cylindrical tube 21. Alternately, the plow can be of the type to form the tube 21 with abutting, rather than overlapping, edges forming the longitudinal seam. Both types of plows are well known in the tube forming art.

As the rolled tube leaves the plow 26, the seam portion of the tube 21 moves along a path adjacent a stationary continuous welding fixture 28, whereby a continuous, welded fluid-tight joint is formed between the overlapping portions of the tube or between the edges of the seam if the edges are abutting. Also within the scope of the present invention are other continuous bonding means for the seam, including soldering or brazing, if compatible with the material comprising the tube 21.

Rearwardly of the welding fixture 28 is disposed a rotatable wrapping head 30 which functions to apply a helical wrapping of resin-impregnated fiber reinforcing material on the welded tube. Fibers that are suitable for this purpose include spun glass, nylon, and long staple natural fibers such as jute, flax, and the like.

The wrapping head 30 includes a toothed ring 32 which is supported for rotation in a fixed plane by a plurality of support rollers 34, that are secured to the bed plate 12. The ring 32 has a central aperture 36 which receives the tubing and has a diameter larger than the outside diameter of the tubing 21 in order to permit free individual movement of both the ring and the tubing.

The ring 32 carries, on the forward side thereof, a spool 38 on which a continuous roll of one or more fiber strands 40 is wound, and on the other side of the ring is mounted a resin receptacle 42. The fiber strand 40 from the spool 38 passes through an aperture 44 in the ring 32 and extends through a bath of thermosetting resin contained in the receptacle 42. A roller 46 is mounted across the upper end of the receptacle to maintain the fiber strand 40 immersed in the resin. Adjacent the roller 46, an eyelet or other guide means is mounted at 48 to receive the fiber strand 40 and guide it over the rear end of the resin receptacle 42.

Both the resin receptacle 42 and the fiber spool 38 are connected to the ring 32 in a manner providing their translatory movement in an orbit encircling the tubing. This mounting may be by means of a pivotal connection of the spool and receptacle to the ring, the pivotal connections being coaxial with the aperture through which the strand 40 passes, and arranged so that the center of gravity of each unit lies under the pivots. Accordingly, the force of gravity will maintain the upright orientation of the spool and of the receptacle. After the end of the fiber strand 40 is anchored to the tube, rotation of the ring 32 will produce a closely spaced wrapping 50 of resin-impregnated fibers on the moving tubing.

The wrapping 50 is caused to be wound in a helical pattern on the tubing by a tubing advancing mechanism 60 which includes two tubing drive wheels 62 which frictionally engage the tubing adjacent the discharge end of the platform 12 and move the tubing rearwardly at a constant rate of speed. This rearward movement of the tubing is at a speed proportionate to the speed of rotation of the ring 32 and may be changed by means of a variable speed transmission 64 which drives the tubing advancing mechanism. In this way the spacing of the helically wrapped fiber strand 40 can be altered to produce the desired tubing strength according to the strength of the fiber strands employed. It will be seen that the most ideal condition is for the truck 10 to advance at the precise rate the finished tubing is discharged. This can be accomplished in different complex ways, but a simple and satisfactory solution is to employ a fluid drive coupling between the truck's engine and wheels. This permits a slippage in the truck drive train that will always keep a slight tension on the completed tubing.

The transmission 64 has a drive shaft 66 connected to a gear box 68 which drives the tubing discharge wheels 62, and a drive shaft 70 connected to a power unit 72. The power unit 72 may be an electric motor energized by a generator connected to the truck engine, or an internal combustion engine, and is coupled by a roller chain drive train 74 to a jackshaft 76 which is rotatably mounted on the platform 12. One end of the jackshaft is provided with a gear 78 that meshes with the toothed ring 32. The other end of the jackshaft 76 carries a gear 80 which drives a second wrapping head 82.

Included in the wrapping head 82 is a toothed ring 84 which is meshed with the gear 80. The ring 84 is provided with a large central aperture 85 through which the tubing extends, the aperture being relatively large so that the tubing may be drawn therethrough by the tubing discharge drive wheels 62 while the ring 84 is rotated by the gear 80. The ring 84 is supported for rotation upon rollers 86 which are identical to the rollers 34 and hold the ring 84 in a plane normal to the path of the advancing tubing.

A spool 90, wound with a band of flexible protective material 92, is journalled for free rotation on a shaft 93 which is secured to the ring 84 and extends angularly thereto. In the well known manner, the web of material 92 is thus caused to be wound on the tubing with the edges of the material either abutting or overlapping, according to the width of the web and the angularity of the shaft 93. This wrapping is for the purpose of enclosing and compressing the wet layer of reinforcing fibers and to provide a protective coating on the tube which is not adversely affected by the elements. A material suitable for the outer covering 92 might be selected from materials such as flexible sheet plastics, plastic or asphalt impregnated papers, glass fiber products, or thin metals such as aluminum foil.

It will be understood that the protective material 92 is applied to the tube in a dry condition but that the thermosetting resin upon which it is wound will rapidly bond the protective covering to the tube. It will also be evident that the protective material can be coated or impregnated with resin, if desired, and that if the tube does not require any protective covering to guard against abrasion or to protect it from corrosive minerals in the ground, the outer layer of material 92 can be dispensed with.

A guide head 94 is affixed to the platform 12 adjacent the rear of the truck 10 and is provided with freely rotatable spools which engage the tubing walls and preserve the alignment of the advancing tubing with the rings 84 and 32. A second guide head 95 cooperates with head 94 to guide the pipe downwardly from the truck toward the ground or toward a trench T. As the tube leaves the truck, it flexes downwardly and is laid directly upon the ground or in the trench. The preferred arrangement is one in which the tube is positioned while it is hardening in the location where it is to be permanently installed, because the tubing is very flexible until the thermosetting resin hardens and it will therefore assume the contour of the ground where it is cured. The tube might, therefore, be damaged if it is laid after it cures upon some other contour to which it does not conform, and then covered with backfill.

The curing process may be hastened by means of a hot air blower and heater unit 98 that is mounted adjacent the plow 26 and is provided with a heat conducting conduit 100 that has an open end directed into the curled web 20 being formed into tubing 21 in the plow. The finished end of the tube 96 is left open so that the heated air circulates through the tube and, by conduction through the metallic inner lining 21, warms the resin to assist in its curing.

In a further embodiment of the present invention, the base platform 12 can be lifted from the truck 10 by means of eye bolts 102 and mounted on a suitable support so that the tube forming mechanisms 14 can be operated as a stationary installation when suitable power is supplied thereto. If very long lengths of tubing are produced, the tubing must be advanced by auxiliary power means in addition to the tubing discharge mechanism 60, as for instance, by pulling the tubing 96 by means of the truck 10. For relatively short lengths of tubing, depending upon the diameter and weight of the tubing, the discharge mechanism 60 will suffice.

While a particular embodiment of the present invention has been shown and described it will be understood that the process and apparatus of this invention are each capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. A method of manufacturing and installing a continuous semi-rigid tube comprising the steps of unrolling a flat web of heat conductive flexible material from a continuous coil, continuously advancing the web lengthwise, transversely rolling the moving web into a cylindrical tube as the web advances from the coil, said rolling causing the side edges of the web progressively to converge to form a seam, effecting an endless fluid-tight bond between said side edges along said seam to form the web into a tube, wrapping the tube with an uncured thermosetting resin-impregnated reinforcing material, wrapping the reinforcing material and the tube with a protective covering over said reinforcing material, depositing by flexing the continuous, wrapped tube upon a support before the resin is completely set, and forcing hot air into the tube between said converging side edges and thence through the tube as the same is being formed to effect polymerization of the resin and consequent bonding together of the tube, the reinforcing material and the protective covering by heat transfer through the heat conductive material.

2. Apparatus for forming and installing a continuous tube comprising means for rotatably supporting a rolled web of sheet metal, drive means for unrolling and advancing the web lengthwise, forming means for continuously curling the moving web transversely into a tube having a longitudinal linear seam, said forming means causing the side edges of the web progressively to converge to form said seam, bonding means for effecting an endless fluid-tight joint between the seam edges of the web, a first wrapping means for applying a reinforcement layer impregnated with an uncured thermosetting adhesive to the tube, a second wrapping means for covering said reinforcement layer with a protective layer over said reinforcement layer in order to compress said reinforcement layer and force the adhesive thereof to bond said protective layer thereto, means for guiding and flexing the continuous tube from the apparatus and onto a support surface, and means for forcing a heated air stream into the tube between said converging side edges of the web and thence through the tube to set the adhesive by heat conducted through the metal wall of the tube while the tube is lying on said support surface.

3. In a continuous tube forming apparatus wherein a metallic tube lining having a wrapping of reinforcing material impregnated with an uncured thermosetting resin is formed on a first support surface and allowed to flex onto a second support surface where it is cured, the improvement comprising: means for unrolling a flat web of sheet metal from a coil, means for continuously advancing the web lengthwise, forming means on said first support surface for transversely curling said flat metallic web to cause the edges to converge to form said tube as the web advances from the coil, said forming means providing a passage communicating with the interior of the tube being formed, bonding means for effecting an endless fluid tight joint between the edges of the web, means for continuously applying a reinforcing wrapping impregnated with an uncured thermosetting resin to the formed tube, means for discharging the wrapped continuous tube and allowing it to flex onto said second support surface, means for continuously moving said support surfaces relatively to each other in the longitudinal direction of said tube to permit the continuous formation of said tube, and means for generating a heated gaseous stream and forcing the heated stream into said passage and through the entire length of the tube to set the resin while the tube is lying on said second support surface by heat conducted thereto by said metallic lining.

References Cited in the file of this patent
UNITED STATES PATENTS

| | | |
|---|---|---|
| 2,321,738 | Farny | June 15, 1943 |
| 2,605,202 | Reynolds | July 29, 1952 |
| 2,650,420 | True | Sept. 1, 1953 |
| 2,718,684 | Bjorksten | Sept. 27, 1955 |